United States Patent
Chakraborty et al.

(10) Patent No.: US 11,108,865 B1
(45) Date of Patent: Aug. 31, 2021

(54) BATTERY POWERED END POINT DEVICE FOR IOT APPLICATIONS

(71) Applicant: Zurn Industries, LLC, Milwaukee, WI (US)

(72) Inventors: Arindam Chakraborty, Milwaukee, WI (US); Richard Ryer, Milwaukee, WI (US); Brandon Feil, Milwaukee, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 16/953,101

(22) Filed: Nov. 19, 2020

Related U.S. Application Data

(60) Provisional application No. 63/057,116, filed on Jul. 27, 2020.

(51) Int. Cl.
*H04L 29/00* (2006.01)
*H04L 29/08* (2006.01)
*H02J 7/00* (2006.01)

(52) U.S. Cl.
CPC ............ *H04L 67/12* (2013.01); *H02J 7/0063* (2013.01); *H04L 67/10* (2013.01)

(58) Field of Classification Search
CPC ......... H04L 67/12; H04L 67/10; H04L 29/00; H02J 7/0063
See application file for complete search history.

(56) References Cited

U.S. PATENT DOCUMENTS

| | | | |
|---|---|---|---|
| 4,563,780 A | 1/1986 | Pollack | |
| 4,805,247 A | 2/1989 | Laverty, Jr. | |
| 5,175,892 A | 1/1993 | Shaw | |
| 5,217,035 A | 6/1993 | Van Marcke | |
| 5,438,714 A | 8/1995 | Shaw | |
| 5,612,890 A | 3/1997 | Strasser et al. | |

(Continued)

FOREIGN PATENT DOCUMENTS

| | | |
|---|---|---|
| JP | 2002021149 A | 1/2002 |
| WO | 1996041058 A1 | 12/1996 |
| WO | 2002056540 A2 | 7/2002 |

OTHER PUBLICATIONS

Claude A. Wiatrowski, "Microprocessor Restroom Robot," Computer Design The Magazine of Digital Electronics, Apr. 1977, (pp. 98-100).

(Continued)

*Primary Examiner* — Khai M Nguyen
(74) *Attorney, Agent, or Firm* — Michael Best & Friedrich LLP

(57) ABSTRACT

Methods and systems of monitoring and managing a facility including a plurality of end point devices. One system includes an end point device including an electronic processor, the electronic processor powered by an energy source local to the end point device. The electronic processor is configured to receive data from at least one electro-mechanical element of a fixture associated with the facility, the data related to an operation of the fixture. The electronic processor is also configured to convert the data pursuant to a networking protocol. The electronic processor is also configured to enable, over a network associated with the networking protocol, transmission of the converted data for virtual processing.

20 Claims, 9 Drawing Sheets

(56) References Cited

U.S. PATENT DOCUMENTS

| | | |
|---|---|---|
| 5,655,961 A | 8/1997 | Acres et al. |
| 5,838,258 A | 11/1998 | Saar |
| 5,844,808 A | 12/1998 | Konsmo et al. |
| 6,018,827 A | 2/2000 | Shaw et al. |
| 6,038,519 A | 3/2000 | Gauthier et al. |
| 6,189,163 B1 | 2/2001 | Van Marcke |
| 6,236,953 B1 | 5/2001 | Segal |
| 6,337,635 B1 | 1/2002 | Ericksen et al. |
| 6,347,414 B2 | 2/2002 | Contadini et al. |
| 6,411,920 B1 | 6/2002 | McConnell et al. |
| 6,583,720 B1 | 6/2003 | Quigley |
| 6,691,724 B2 | 2/2004 | Ford |
| 6,694,177 B2 | 2/2004 | Eggers et al. |
| 6,701,194 B2 | 3/2004 | Gauthier et al. |
| 6,749,122 B1 | 6/2004 | Koenck et al. |
| 6,766,221 B1 | 7/2004 | Christiansen |
| 6,769,443 B2 | 8/2004 | Bush |
| 6,802,084 B2 | 10/2004 | Ghertner et al. |
| 6,853,958 B1 | 2/2005 | Turin et al. |
| 6,854,053 B2 | 2/2005 | Burkhardt et al. |
| 6,892,746 B2 | 5/2005 | Ford |
| 6,956,498 B1 | 10/2005 | Gauthier et al. |
| 6,967,565 B2 | 11/2005 | Lingemann |
| 7,023,341 B2 | 4/2006 | Stilp |
| 7,053,767 B2 | 5/2006 | Petite et al. |
| 7,058,457 B2 | 6/2006 | Kuwahara et al. |
| 7,119,658 B2 | 10/2006 | Stilp |
| 7,143,007 B2 | 11/2006 | Long et al. |
| 7,177,725 B2 | 2/2007 | Nortier et al. |
| 7,222,111 B1 | 5/2007 | Budike, Jr. |
| 7,304,569 B2 | 12/2007 | Marcichow |
| 7,360,413 B2 | 4/2008 | Jeffries et al. |
| 7,814,582 B2 | 10/2010 | Reddy et al. |
| 8,028,355 B2 | 10/2011 | Reeder et al. |
| 8,364,546 B2 | 1/2013 | Yenni et al. |
| 9,169,625 B2 | 10/2015 | Chiu et al. |
| 9,266,136 B2 | 2/2016 | Klicpera |
| 9,429,453 B1 * | 8/2016 | O'Keeffe ............... G01D 4/004 |
| 9,830,565 B2 | 11/2017 | O'Toole |
| 9,939,299 B2 | 4/2018 | Patel et al. |
| 9,963,863 B2 | 5/2018 | Allard, III |
| 10,264,588 B2 | 4/2019 | Wegelin et al. |
| 10,329,744 B2 | 6/2019 | Abdel-Fattah et al. |
| 10,361,802 B1 | 7/2019 | Hoffberg-Borghesani et al. |
| 10,430,737 B2 | 10/2019 | Yenni et al. |
| 10,504,355 B2 | 12/2019 | Wegelin et al. |
| 10,514,110 B2 | 12/2019 | Allard, III |
| 10,527,191 B2 | 1/2020 | Bush et al. |
| 10,529,167 B2 | 1/2020 | Khamphilapanyo et al. |
| 10,529,219 B2 | 1/2020 | Herdt et al. |
| 10,532,920 B2 | 1/2020 | Slater et al. |
| 10,655,967 B2 | 5/2020 | Wegelin et al. |
| 10,687,340 B2 | 6/2020 | Wegelin et al. |
| 10,921,381 B2 * | 2/2021 | Karner ............... G01R 31/382 |
| 2002/0099454 A1 | 7/2002 | Gerrity |
| 2014/0249854 A1 * | 9/2014 | Moore ............... G16H 15/00 705/3 |
| 2016/0258144 A1 | 9/2016 | Tayenaka et al. |
| 2017/0038224 A1 | 2/2017 | O'Keeffe et al. |
| 2017/0223807 A1 * | 8/2017 | Recker ............... H05B 47/19 |
| 2018/0198639 A1 * | 7/2018 | Ishizaka ............... H04L 12/2836 |
| 2018/0354777 A1 | 12/2018 | Slater et al. |
| 2019/0351442 A1 | 11/2019 | McNulty et al. |
| 2019/0353278 A1 | 11/2019 | Bush et al. |
| 2019/0354535 A1 | 11/2019 | Amin et al. |
| 2019/0359477 A1 | 11/2019 | Wegelin et al. |
| 2019/0360184 A1 | 11/2019 | Lawinger |
| 2019/0362617 A1 | 11/2019 | Bonner et al. |
| 2020/0097030 A1 | 3/2020 | Carlson |
| 2020/0098199 A1 | 3/2020 | Bullock |
| 2020/0099679 A1 | 3/2020 | Carlson |
| 2020/0140254 A1 | 5/2020 | Slater et al. |
| 2020/0141773 A1 | 5/2020 | Burke et al. |
| 2020/0145257 A1 * | 5/2020 | Samudrala ............ H04L 12/2854 |
| 2020/0232832 A1 * | 7/2020 | Burke ............... G06F 1/3243 |
| 2020/0314866 A1 | 10/2020 | Wegelin et al. |
| 2020/0358852 A1 | 11/2020 | Burke et al. |
| 2020/0404357 A1 * | 12/2020 | Kulkarni ............ G06K 19/0672 |
| 2021/0144210 A1 * | 5/2021 | Kolhapure ............. H04L 67/12 |

OTHER PUBLICATIONS

Lighting Answers, "Controlling Lighting with Building Automation Systems," vol. 4, No. 1, May 1997, <https://www.lightingassociates.org/i/u/2127806/f/tech_sheets/Lighting_Control.pdf>, (8 pages).

Yuri-May L. Chang and James Y. Shih, "Microprocessor Applications and Building Control Systems to Achieve Energy Conservation," U.S. Department of Commerce and National Bureau of Standards, Jul. 1980, <https://www.govinfo.gov/content/pkg/GOVPUB-C13-e5481618eda4a471a0aab647d520b129/pdf/GOVPUB-C13-e5481618eda4a471a0aab647d520b129.pdf>, (54 pages).

Johnson Controls, "Metasys® for Validated Environments (MVE)," Product Bulletin, Dec. 15, 2001, (13 pages).

Ge, "Lightsweep Lighing Control System", Product Literature, Dec. 8, 2015, (12 Pages).

Trane, "Tracer™ SC System Controller for Tracer Building Automated Systems", Product Catalog, P/N BAS-PRC031-EH, Jun. 10, 2013 (27 Pages).

Lutron, "Quantum Unlimited Capability for High-Performance Buildings", Product Literature, P/N 367-1321, Apr. 2018, (20 Pages).

AcuityControls, "SensorView Manual", Nov. 3, 2015, (123 Pages).

AcuityControls, "nLight Network Lighting Control", Copyright 2014, (78 Pages).

Lutron, "What is Lighting Control System", Product Literature 366-396h, Publicly available prior to Nov. 19, 2020, (19 Pages).

* cited by examiner

BATTERY POWERED END POINT DEVICE FOR IOT APPLICATIONS

RELATED APPLICATIONS

This application claims priority to U.S. Provisional Patent Application No. 63/057,116, filed on Jul. 27, 2020, the entire contents of which are incorporated herein by reference.

FIELD

Embodiments relate to monitoring and managing a facility having a plurality of end point devices, and, more particularly, to a smart and connected modular battery powered end point device for internet-of-things ("IoT") applications.

SUMMARY

In the field of facility or building management, there is a desire to monitor performance of restroom fixtures, such as, for example, faucets, flush valves, hand dryers, floor drains, air or room quality sensors, backflow preventers, bottle fillers, pressure sensors, leak detection sensors, occupancy detection sensors, resource dispensers (for example, a soap dispenser, a sanitizer dispenser, a room deodorizer dispenser, a paper tower dispenser), and the like. As one example, a building manager may want to monitor water usage or consumption for one or more restroom facilities within the building. Such monitoring may be performed for predictive maintenance, alerting, for collecting data on usage of the restroom(s), or the like. For example, monitoring may indicate that there is a certain percentage of life remaining for a flush valve (or a component of the flush valve) based on a rated life of flushes and a number of flush operations performed by the flush valve. As another example, monitoring may generate alerts, such as a low soap alert, a backflow discharge in progress alert, a drain clogged alert, and the like. However, these applications are typically in locations that are not serviced by mains power, are difficult to reach, and are limited in size, which, ultimately, limits the size of batteries that may be used. Therefore, there is a need for a battery-powered solution that provides a low power consumption solution while also accommodating the limited size constraints.

Accordingly, the embodiments described herein provide methods and systems for monitoring and managing a facility (e.g., a building or one or more rooms within a building) using a plurality of smart and connected modular battery powered end point devices. Embodiments described herein enable a quick and simple sensor input customization while maintaining a common connectivity architecture to support data reporting to a central cloud-based database (for example, for various IoT applications). Additionally, embodiments may be implemented with hardware and industrial designs engineered such that the assembly process is easy, and, ultimately, makes the field serviceability of the product straight-forward. For example, the hardware electronics may be designed to intake various analog and digital inputs which provide the product great flexibility. Additionally, in some embodiments, the battery life may be monitored using various indicators, such as a graphical representation of a fuel gauge. Alternatively or in addition, embodiments may generate alerts and warnings in response to detecting an end of battery life scenario, a battery replacement scenario, and the like.

For example, one embodiment provides an end point device associated with a facility. The end point device includes a first energy source. The end point device also includes an electronic processor communicatively coupled to the first energy source and powered by the first energy source. The electronic processor is configured to receive data from at least one electro-mechanical element of a fixture associated with the facility, the data related to an operation of the fixture. The electronic processor is also configured to convert the data pursuant to a networking protocol. The electronic processor is also configured to enable, over a network associated with the networking protocol, transmission of the converted data to a remote device for virtual processing.

Another embodiment provides a system for monitoring and managing a facility including a plurality of end point devices. The system includes an end point device including an electronic processor, the electronic processor powered by an energy source local to the end point device. The electronic processor is configured to receive data from at least one electro-mechanical element of a fixture associated with the facility, the data related to an operation of the fixture. The electronic processor is also configured to convert the data pursuant to a networking protocol. The electronic processor is also configured to enable, over a network associated with the networking protocol, transmission of the converted data for virtual processing.

Yet another embodiment provides a method for monitoring and managing a facility. The method includes providing an end point device powered by an energy source, the energy source local to the end point device. The method also includes powering, with the energy source, one or more components of the end point device. The method also includes receiving, with an electronic processor of the end point device, data from at least one electro-mechanical elements of a fixture associated with the facility, wherein the data is associated with an operation of the fixture. The method also includes, in response to receiving the data, converting, with the electronic processor, the data pursuant to a networking protocol and transmitting, over a network associated with the networking protocol with the electronic processor, the converted data for virtual processing.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
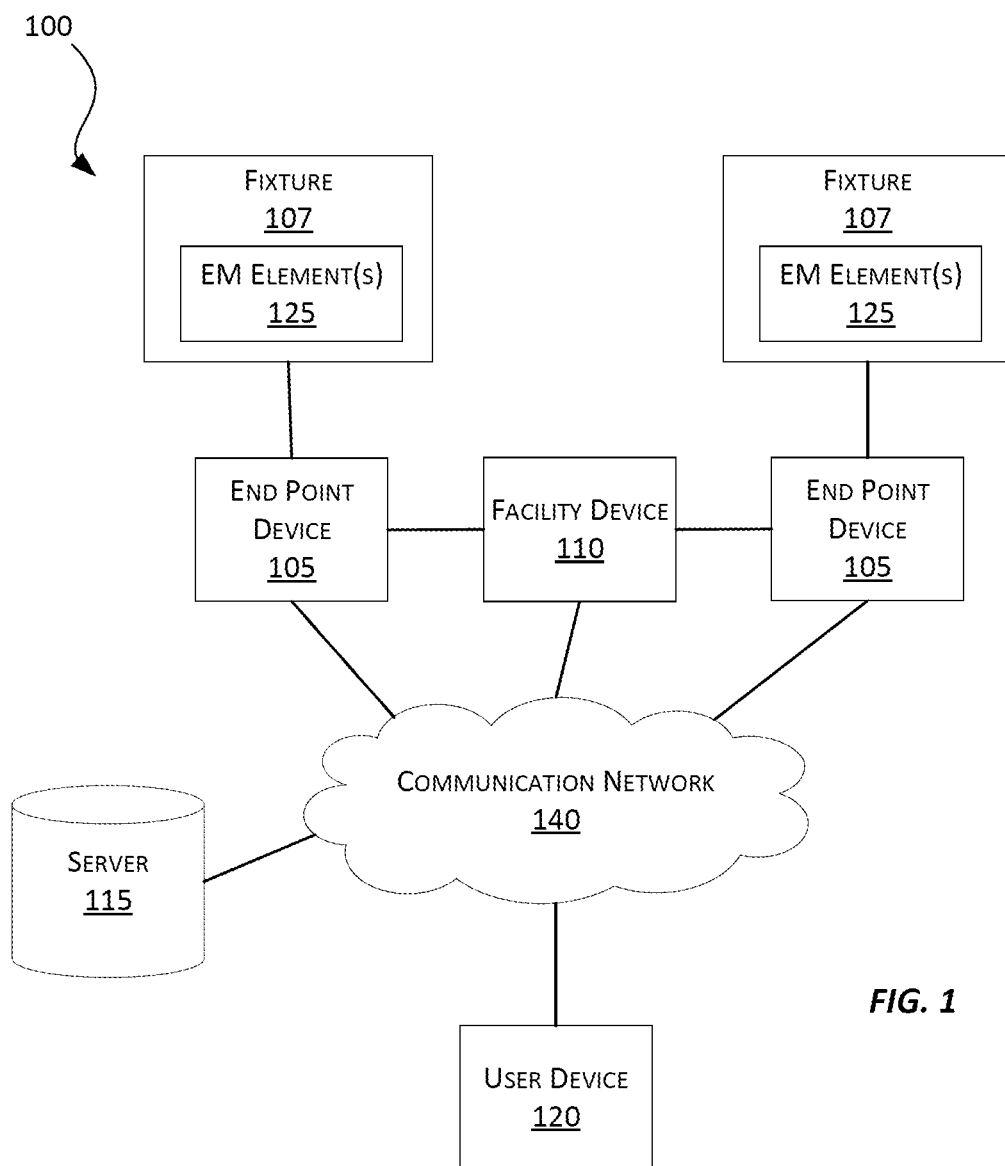
FIG. 1 schematically illustrates a system for monitoring and managing a facility having a plurality of end point devices according to some embodiments.

FIG. 1 illustrates a system 100 for monitoring and managing a facility (e.g., a building or one or more rooms within a building) according to some embodiments. In the illustrated example, the system 100 includes a plurality of end point devices 105 (collectively referred to herein as "the end point devices 105" and individually as "an end point device 105"), a plurality of fixtures 107 (collectively referred to herein as "the fixtures 107" and individually as "a fixture 107"), a facility device 110 (e.g., a gateway), a server 115 (e.g., cloud server), and a user device 120. In some embodiments, the system 100 includes fewer, additional, or different components than illustrated in FIG. 1 in various configurations. For example, the system 100 may include multiple facility devices 110, servers, 115, user devices 120, or a combination thereof. Additionally, the system 100 may include any number of end point devices 105 and/or fixtures 107 and the two endpoint devices and fixtures illustrated in FIG. 1 are purely for illustrative purposes. Also, in some embodiments, one or more of the components of the system 100 may be distributed among multiple devices, combined within a single device, or a combination thereof. As one example, in some embodiments, one or more of the end point devices 105 may be incorporated within a fixture 107 as a single device. Accordingly, in some embodiments, the functionality described as being performed by the end point device 105 (or a portion thereof) may be performed by a fixture 107 (including built-in or attached similar hardware and software components as the end point device 105).

The end point devices 105, the fixtures 107, the facility device 110, the server 115, and the user device 120 communicate over one or more wired or wireless communication networks 140. Portions of the communication networks 140 may be implemented using a wide area network ("WAN"), such as the Internet or a LoRa system, a local area network ("LAN"), such as a Bluetooth™ network or Wi-Fi, and combinations or derivatives thereof. Accordingly, components of the system 100 may be configured to communicate via Bluetooth, Wi-Fi, Zigbee, LTE/Cellular, wired ethernet, RS485/RS232, or the like. As one example, the end point devices 105 may communicate via LoRa with the facility device 110. Alternatively or in addition, in some embodiments, one or more components of the system 100 communicate directly as compared to through the communication network 140. For example, in some embodiments, the end point devices 105 communicate directly with the facility device 110. Also, in some embodiments, the components of the system 100 communicate through one or more intermediary devices not illustrated in FIG. 1.

Additionally, in some embodiments, one or more components of the system 100 communicate using LoRa or LoRaWAN networking protocols (for example, the end point device 105 and the facility device 110). Using such networking protocols provides for secure, encrypted communication of data without use of a customer or building network. Accordingly, use of such networking protocols may completely isolate an end point device 105 (or other component of the system 100) from a customer or building network.

A fixture 107 may include, for example, a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor (e.g., may include a service request or product replenishment request button or other suitable activator), a backflow preventer, a leak detection sensor, an occupancy detection sensor, and a resource dispenser (for example, a soap dispenser, a sanitizer dispenser, a room deodorizer dispenser, a paper tower dispenser), and the like. Accordingly, in some embodiments, the fixture 107 provides a water management solution. As seen in FIG. 1, each of the fixtures 107 is associated with one or more electro-mechanical ("EM") elements 125. The EM elements 125 are configured to monitor and/or influence the operation of the fixture 107. An EM element 125 may include, but is not limited to, an actuator, a flow sensor, a position sensor, a proximity sensor, a thermocouple, and the like. It is contemplated that the EM elements 125 may include an electrical only element, a mechanical only element, or a combination of an electrical and a mechanical element(s). The EM elements 125 may include a single-piece component or multiple components.

As one example, in some embodiments, the fixture 107 is a faucet having a sensor (for example, as a first EM element 125) configured to detect the presence of a person within a specified zone. When the sensor is triggered (for example, by detecting the presence of a person), the sensor sends an "ON" signal to an actuator (as a second EM element 125) (for example, a valve actuating solenoid) thereby allowing water to selectively flow through the faucet. When the sensor is no longer triggered (for example, by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In such embodiments, the predetermined period of time may be set by a user or facility entity via, for example, the facility device 110, the user device 120, another component of the system 100, or a combination thereof.

As another example, in some embodiments, the fixture 107 is a flush valve having a sensor (for example, as a first EM element 125) configured to detect the presence of a person within a specified zone. When the sensor is triggered (for example, by detecting the presence of a person), the sensor sends an "ON" signal to the actuator (as a second EM element 125) (for example, a valve actuating solenoid) to actuate a valve and initiate a flow of water for a flushing event. The flush valve will then remain open for a predetermined period of time (for example, 5 seconds, 10 seconds, and the like) at least partially dependent upon an operating parameter set by the user via, for example, the facility device 110, the user device 120, another component of the system 100, or a combination thereof.

As yet another example, in some embodiments, the fixture 107 is a resource dispenser (such as a soap dispenser, a hand towel dispenser, and the like) having a sensor (for example, as a first EM element 125) configured to detect the presence of a person within a specified zone. When the sensor is triggered (for example, by the hands of a person), the sensor sends an "ON" signal to an actuator (for example, as a second EM element 125) to trigger a resource dispensing event (for example, actuation of a gear, a valve, or solenoid, and the like to initiate dispensing of a resource). The resource dispenser is configured to allow a predetermined volume or amount of a resource to be dispensed for each activation. In such embodiments, the volume or amount or timing of a resource to be dispensed may be set and adjusted by the user via, for example, the facility device 110, the user device 120, another component of the system 100, or a combination thereof.

The resource dispenser may also include a second sensor (for example, as a third EM element 125) to monitor the level or amount of resource remaining in a reservoir or receptacle. In some embodiments, the second sensor detects a current level or amount of resource in the reservoir or receptacle at a given moment in time. Alternatively or in addition, the second sensor may detect when the resource falls below a predetermined amount or level.

As yet another example, in some embodiments, the fixture 107 is a water service line monitor. The water service line monitor includes a sensor (for example, as a first EM element 125) configured to be retrofit onto an existing water service line and is configured to monitor the flow-rate of water therethrough, the presence of a backflow event, or a combination thereof. More specifically, the sensor may be configured to detect a flow rate, a presence of a backflow event, and the like.

As seen in FIG. 1, an end point device 105 generally includes a communication link with at least one fixture 107. The end point devices 105 may span multiple facilities, locations, rooms, and the like. In some embodiments, each of the end point devices 105 is associated with (located within) the same facility (for example, a restroom facility). However, in other embodiments, the end point devices 105 are associated with multiple facilities. As one example, a first end point device may be associated with a first facility, and a second end point device may be associated with a second different facility that is either in the same building as the first facility or in an entirely different building. Alternatively or in addition, in some embodiments, each of the end point devices 105 is associated with the same type of restroom fixture (for example, the fixture 107). However, in other embodiments, the end point devices 105 are associated with multiple different types of restroom fixtures (for example, the fixture 107). As one example, a first end point device may be associated with a faucet (as a first fixture 107) and a second end point device may be associated with a soap dispenser (as a second fixture 107).

Figure 2:
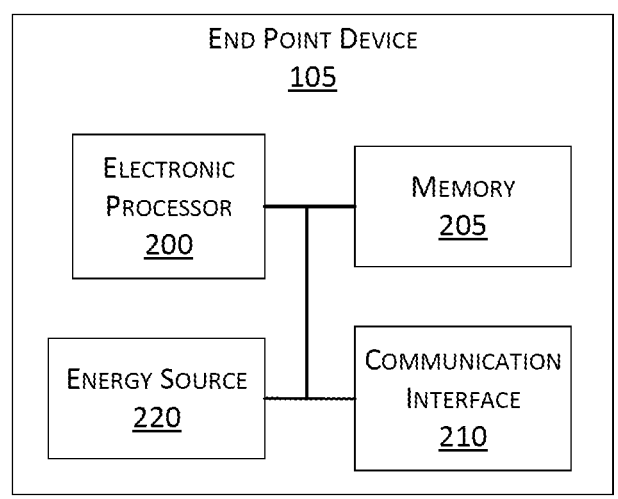
FIG. 2 schematically illustrates an end point device included in the system of FIG. 1 according to some embodiments.

FIG. 2 illustrates an end point device 105 according to some embodiments. In the illustrated example, the end point device 105 includes an electronic processor 200, a memory 205, a communication interface 210, and an energy source 220. The electronic processor 200, the memory 205, the communication interface 210, and the energy source 220 communicate wirelessly, over one or more communication lines or buses, or a combination thereof. In some embodiments, one or more components of the end point device 105 may be distributed among multiple devices, integrated into a single device, or a combination thereof. In some embodiments, the end point device 105 may perform additional functionality other than the functionality described herein. In some embodiments, the end point device 105 may include additional, different, or fewer components than those illustrated in FIG. 2 in various configurations. As one example, in some embodiments, the end point device 105 includes multiple energy sources 220. As another example, in some embodiments, the end point device 105 includes one or more expansion ports allowing for future expansion of the end point device 105. As one example, additional electro-mechanical (EM) elements of a fixture 107 may be connected to the end point device 105 via the one or more of the expansion ports.

The communication interface 210 allows the end point device 105 to communicate with devices external to the end point device 105. For example, as illustrated in FIG. 1, the end point device 105 may communicate with the fixture 107 (or an EM element 125 thereof), the facility device 110, the server 115, the user device 120, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the end point device 105 and the facility device 110.

The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 is configured to enable management and/or monitoring of the operation of the corresponding fixture 107 either directly or indirectly (for example, via the EM element(s) 125 of the corresponding fixture 107). In some embodiments, the electronic processor 200 enables management and/or monitoring of the operation of a corresponding fixture 107 by receiving fixture data from the fixtures 107, converting the fixture data for transmission, and enabling transmission of the converted data to, for example, the facility device 110, the server 115, the user device 120, another component of the system 100, or a combination thereof.

Accordingly, in some embodiments, the electronic processor 200 is configured to interact with and collect data regarding an operation of a fixture 107 (as fixture data) via the EM elements 215 either directly or indirectly. In some embodiments, the end point device 105 is configured to remain in a sleep mode (or deep sleep mode) until an action or operation is detected with respect to a fixture 107 associated with the end point device 105 (for example, detecting the presence of a user). In response to detecting the action or operation, the end point device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. As one example, in some embodiments, when the end point device 105 transmits the converted fixture data (for example, as one or more data packets) to the facility device 110, the transmission may occur through adaptable data rate, which automatically selects the most easily available channel such that the right channel does not have to be searched for, which further aids in the optimization of power.

As seen in FIG. 2, the end point device 105 also includes the energy source 220. The energy source 220 powers one or more components of the end point device 105, such as the electronic processor 200. The energy source 220 may be a battery, such as an energy efficient battery, a re-chargeable battery, a lithium-ion battery, a replaceable battery, or the like. As one example, the energy source 220 is a standard battery (for example, AAA, AA, C, D sized batteries). As noted above, in some embodiments, the end point device 105 includes multiple energy sources 220 (for example, a first energy source, a second energy source, and the like). In such embodiments, the multiple energy sources 220 may be of the same type, different types, or a combination thereof. As one example, the end point device 105 may include three AA batteries as the energy sources 220.

In some embodiments, one or more components of the system 100 may already be present in a completed fixture 107 (for example, a proximity sensor and an actuator in an automated faucet). In such embodiments, additional components may be retro-fit onto the existing fixture 107. Accordingly, in some embodiments, the end point device 105 (or components thereof) may be retro-fit onto or into the existing fixture 107. As one example, a transmitter, a receiver, a transceiver, a combination thereof (as part of the communication interface 210), the electronic processor 200, the energy source 220, or a combination thereof may be mounted in the plumbing immediately upstream of a particular fixture 107. In other examples, the retro-fit may include updating firmware in the already existing device. In still other examples, the retro-fit may include integrating elements into a previously existing fixture 107.

Figure 3A:
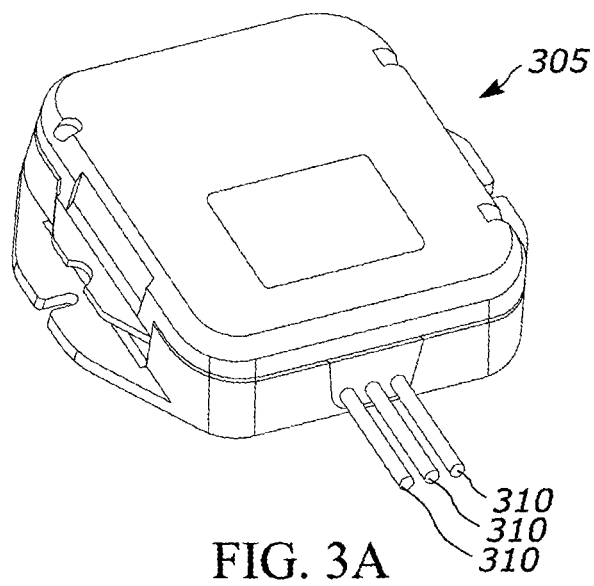
FIGS. 3A-3C illustrate an example electronics housing for an end point device according to some embodiments.
Figure 3B:
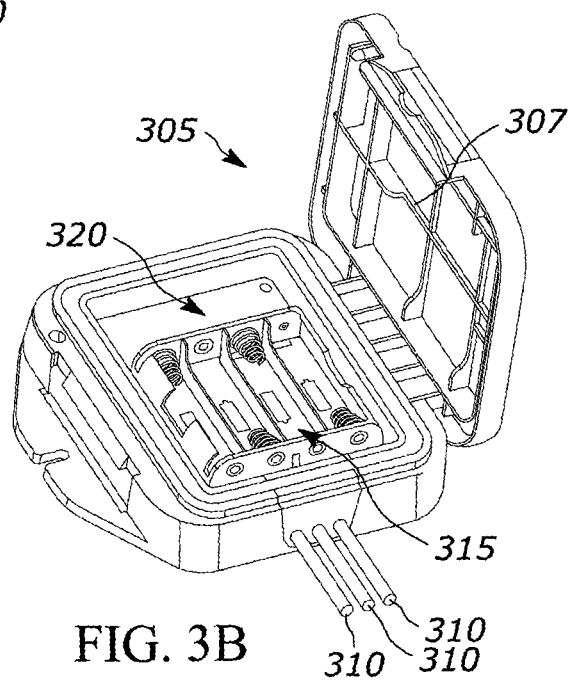
Figure 3C:
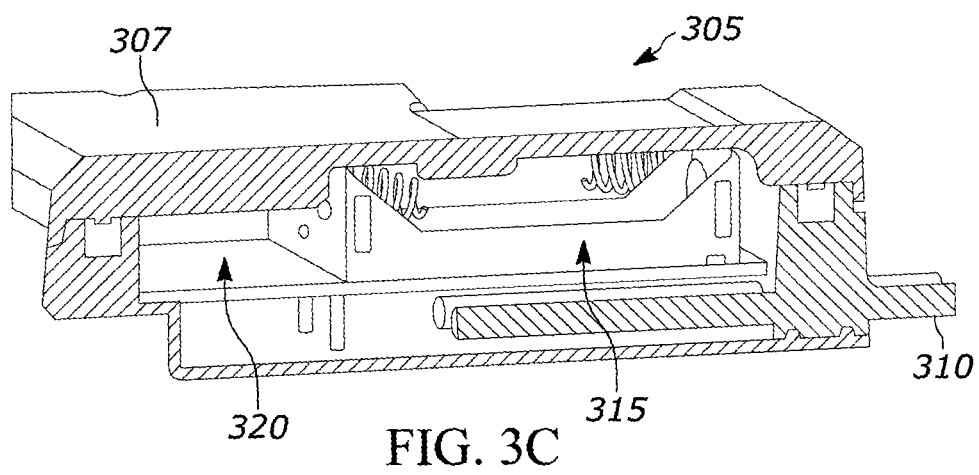

FIGS. 3A-3C illustrate an example electronics housing 305 for an end point device 105 according to some embodiments. As seen in FIGS. 3A-3C, the end point device 105 may include one or more wires or cables 310 extending from the housing 305. The wires 310 may provide a direct or indirect wired connection to, for example, one or more of the EM elements 125 of a fixture 107 associated with the end point device 105. As seen in FIGS. 3B-3C, the housing 305 includes a battery holder 315 (for example, an energy source holder) for receiving one or more batteries (for example, as the energy sources 220). As seen in FIG. 3B, the housing 305 may include a lid portion 307. The lid portion 307 allows a user to easily access the components enclosed within the housing 305 (for example, to remove and replace one or more of the energy sources 220). FIGS. 3B-3C also illustrates a circuit board 320 enclosed within the housing 305 (for example, one or more electronical components of the end point device 105, such as the electronic processor 200).

Figure 4A:
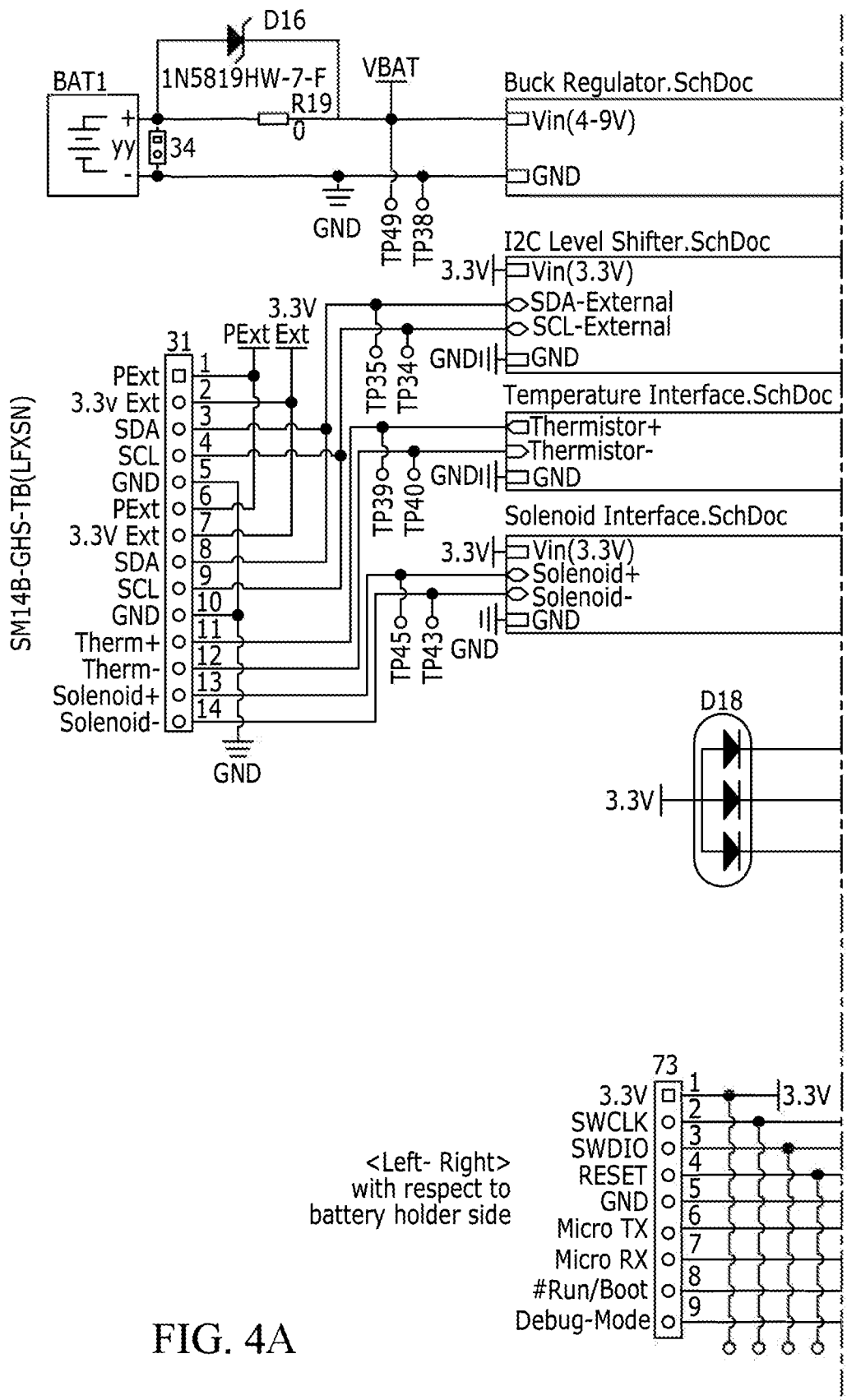
FIGS. 4A-4C illustrate an example circuit diagram for electronics of an end point device according to some embodiments.
Figure 4B:
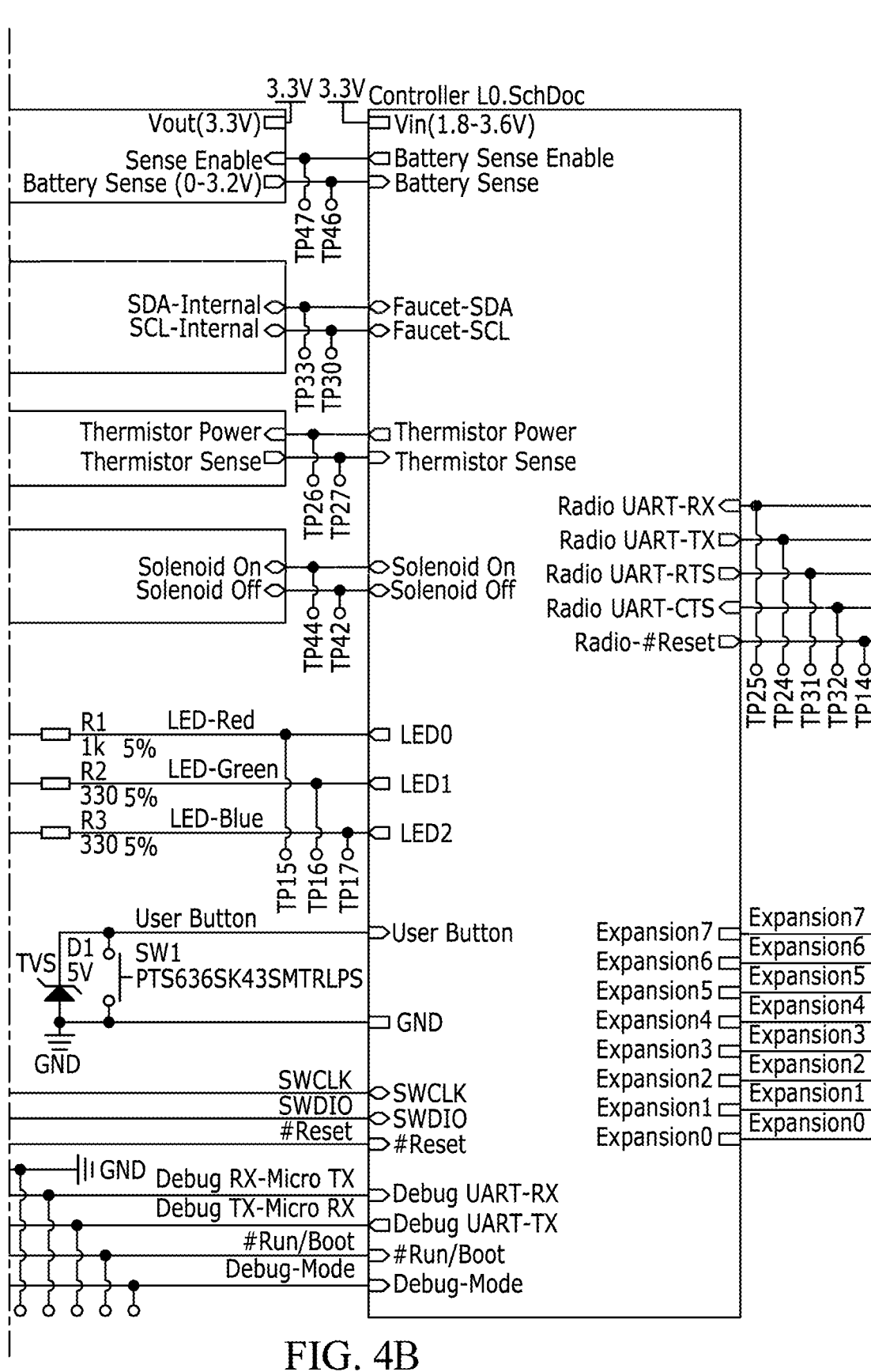
Figure 4C:
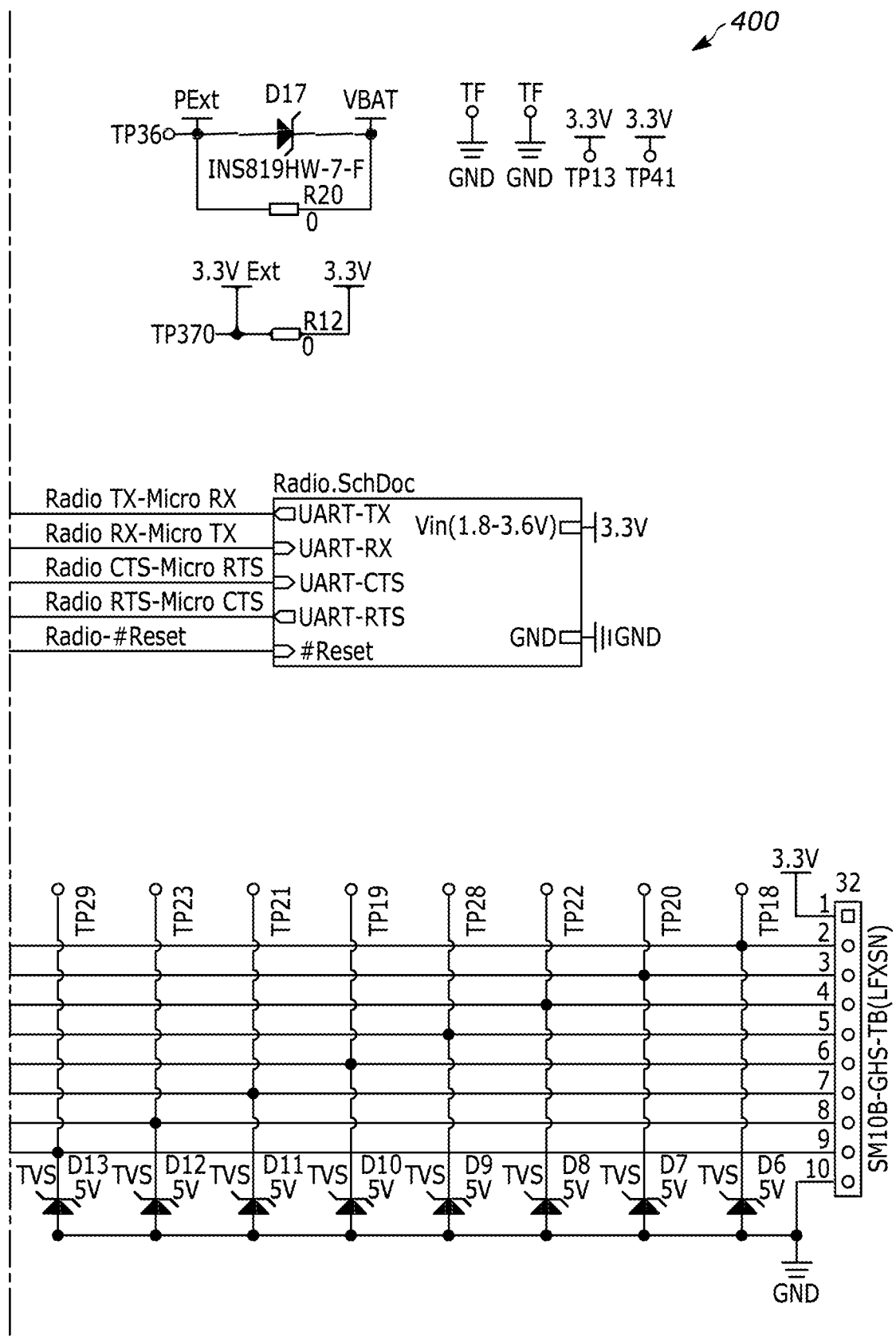

FIGS. 4A-4C illustrate an example circuit diagram 400 for the circuit board 320 of the end point device 105 according to some embodiments. As noted above, in some embodiments, one or more components of the system 100 may be retro-fit onto or into an existing fixture 107. Accordingly, in some embodiments, the electronics housing 305 (and the components therein) may be retro-fit to an existing fixture 107. As one example, the end point device 105 may be mounted to a fixture 107 and communicatively connect the fixture 107 to the end point device 105 (for example, by connecting EM elements 125 of the fixture 107 to the end point device 105 directly or indirectly via one or more of the wires or cables 310). Accordingly, in some embodiments, one or more components of the end point device 105 (such as the electronics housing 305, including the components therein) are designed as discrete, self-enclosed, add-on components or devices capable of retro-fitting to an existing installation of a fixture 107.

Figure 5:
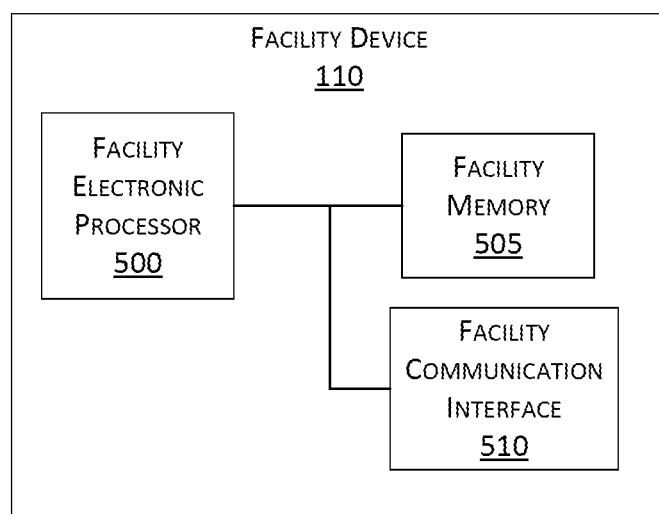
FIG. 5 schematically illustrates a facility device included in the system of FIG. 1 according to some embodiments.

FIG. 5 illustrates the facility device 110 according to some embodiments. In the illustrated example, the facility device 110 includes a facility electronic processor 500, a facility memory 505, and a facility communication interface 510. The facility electronic processor 500, the facility memory 505, and the facility communication interface 510 communicate wirelessly, over one or more communication lines or buses, or a combination thereof. The facility device 110 may include additional, different, or fewer components than those illustrated in FIG. 5 in various configurations. For example, in some embodiments, the facility device 110 includes a human-machine interface for interacting with a user. The human machine interface may include one or more input devices, one or more output devices, or a combination thereof. In some embodiments, one or more components of the facility device 110 may be distributed among multiple devices, integrated into a single device, or a combination thereof. In some embodiments, the facility device 110 may perform additional functionality other than the functionality described herein. Also, the functionality (or a portion thereof) described herein as being performed by the facility device 110 may be distributed among multiple devices.

The facility communication interface 510 allows the facility device 110 to communicate with devices external to the facility device 110. For example, as illustrated in FIG. 1, the facility device 110 may communicate with the end point devices 105, the fixtures 107, the server 115, the user device 120, or a combination thereof through the facility communication interface 510. The facility communication interface 510 may include a port for receiving a wired connection to an external device (for example, a USB cable and the like), a transceiver for establishing a wireless connection to an external device (for example, over one or more communication networks 140, such as the Internet, a LAN, a WAN, such as a LoRa system, and the like), or a combination thereof.

The facility electronic processor 500 is configured to access and execute computer-readable instructions ("software") stored in the facility memory 505. The software may include firmware, one or more applications, program data, filters, rules, one or more program modules, and other executable instructions. For example, the software may include instructions and associated data for performing a set of functions, including the methods described herein.

In some embodiments, the facility device 110 serves as a gateway or intermediary device that receives data (for example, the fixture data) from the electronic processors 200 of one or more of the end point devices 105 and forwards the collected data to another component for processing, such as the server 115, the user device 120, or a combination thereof. For example, in some embodiments, the facility device 110 forwards the data to a remote server (for example, the server 115) for virtual processing. Accordingly, as noted above, in some embodiments, the functionality (or a portion thereof) described as being performed by the facility device 110 may be performed by another remote device or server (not shown).

Returning to FIG. 1, the server 115 and the user device 120 are computing devices, such as a desktop computer, a laptop computer, a tablet computer, a terminal, a smart telephone, a smart television, a smart wearable, or another suitable computing device that interfaces with a user. Although not illustrated in FIG. 1, the server 115 and the user device 120 may include similar components as the facility device 110, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

In some embodiments, the server 115 may include multiple electronic processors, multiple memory modules, multiple communication interfaces, or a combination thereof. Also, it should be understood that the functionality described herein as being performed by the server 115 may be performed in a distributed nature by a plurality of computers located in various geographic locations. For example, the functionality described herein as being performed by the server 115 may be performed by a plurality of computers included in a cloud computing environment.

The server 115 is configured to monitor and manage one or more facilities (e.g., individual restrooms or entire buildings), including the fixtures 107 therein. In some embodiments, the server 115 (via an electronic processor of the server 115) may receive fixture data from the facility device 110. In response to receiving the fixture data, the server 115 may process the fixture data in order to determine usage information or patterns associated with the one or more facilities, including the fixtures 107 thereof. The server 115 may store the usage information or patterns in, for example, a memory of the server 115. Alternatively or in addition, the server 115 may transmit the usage information or patterns to a remote device for storage.

A user may interact with and access data associated with one or more facilities, such as one or more of the fixtures 107 therein (for example, the usage information or patterns determined by the server 115). The user device 120 may be used by an end user, such as a facility entity, to monitor and manage a facility (a single restroom or multiple restrooms in a building), one or more fixtures 107 of a facility, or a combination thereof. For example, a user may access and interact with the data determined by the server 115 to view and understand usage patterns, which may allow a facility entity or maintainer insights into, for example, how to optimize cleaning and maintenance schedules, whether there is a need for additional facilities, end point devices, or a combination thereof. For example, to communicate with the server 115 (i.e., the usage information or patterns determined by the server 115), the user device 120 may store a browser application or a dedicated software application executable by an electronic processor for interacting with the server 115.

Figure 6:
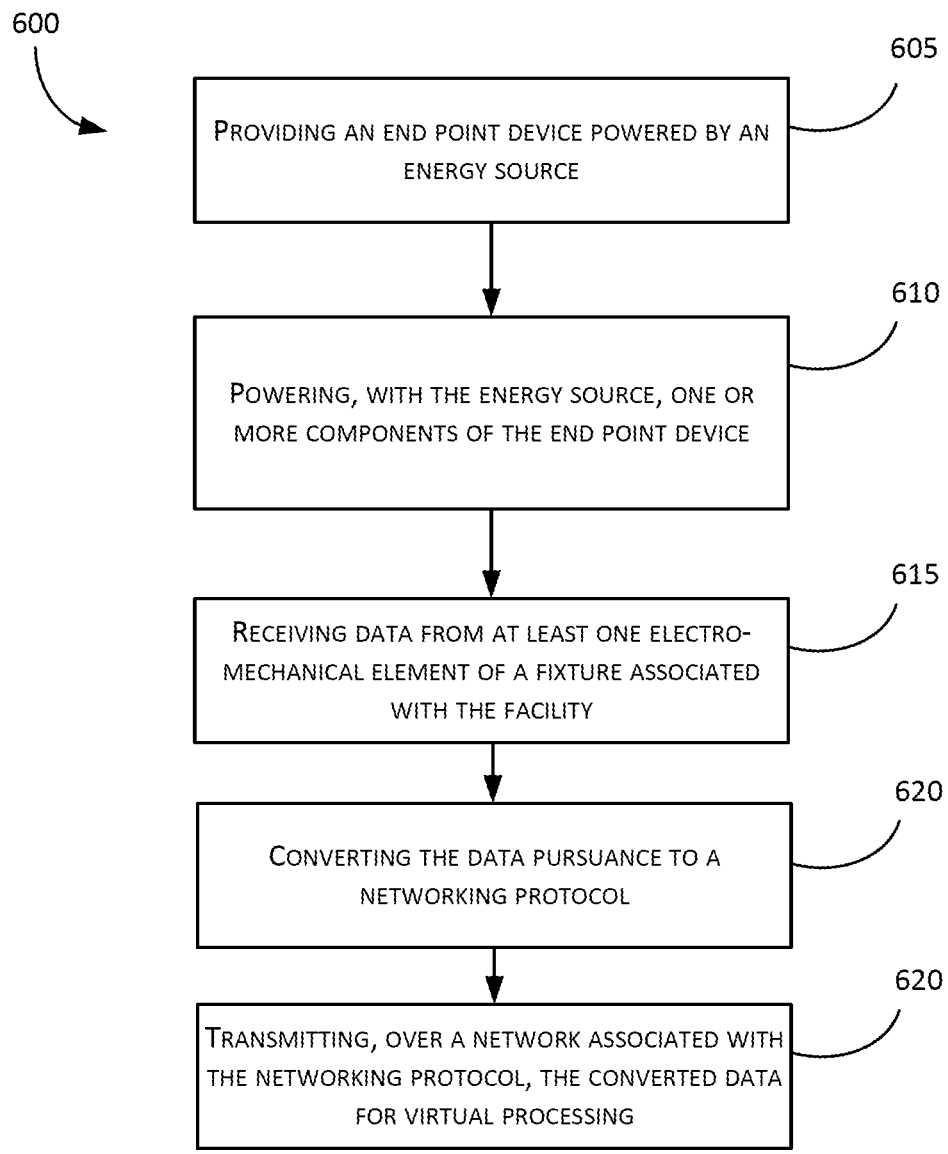
FIG. 6 is a flowchart illustrating a method for monitoring and managing a facility having a plurality of end point devices using the system of FIG. 1 according to some embodiments.
Figure 7:
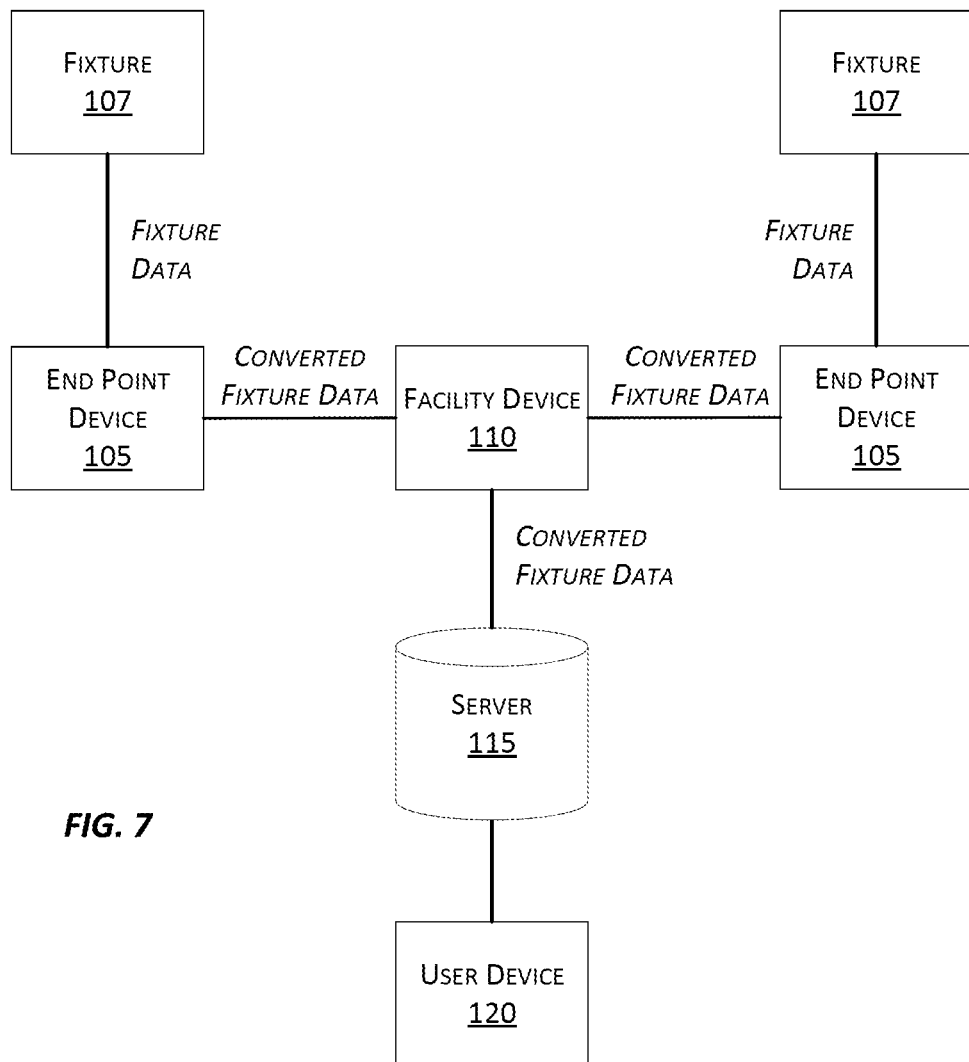
FIG. 7 schematically illustrates communication between components of the system of FIG. 1 according to some embodiments.

FIG. 6 is a flowchart illustrating a method 600 for monitoring and managing a facility according to some embodiments. The method 600 will be described with reference to FIG. 7. FIG. 7 schematically illustrates communication between components of the system 100 according to some embodiments.

As seen in FIG. 6, the method 600 includes providing an end point device 105 powered by the energy source 220 (at block 605). Accordingly, in some embodiments, the energy source 220 is local to the end point device 105. As noted above, in some embodiments, the end point device 105 is provided or mounted to a wall in a facility or to a pre-existing installation of a fixture 107. However, in other embodiments, the end point device 105 is provided to or mounted to the fixture 107 prior to or during installation of the fixture 107 within a facility. As one example, the electronic housing 305 of FIGS. 3A-3C are provided or mounted to a wall in a facility or to the fixture 107.

The energy source 220 then powers one or more components of the end point device 105 (at block 610). For example, the energy source 220 may power the electronic processor 200. In some embodiments, the electronic processor 20 receives data (for example, the fixture data) from at least one EM element 125 (a first EM element) included in a set of EM elements 125 (at block 615). The data received from the first EM element 125 may be associated with an operation of the fixture 107. For example, as illustrated in FIG. 7, the fixtures 107 (the EM elements 125 thereof) transmit fixture data to the end point devices 105.

In some embodiments, in response to receiving the data (at block 615), the electronic processor 200 converts the data pursuant to a networking protocol (at block 620). In some embodiments, the electronic processor 200 may convert the data pursuant to specific networking protocol consistent with a network connection between the end point device 105 and the facility device 110. As one example, the electronic processor 200 may convert the data pursuant to LoRa networking protocols for transmission over a LoRa connection between the end point device 105 and the facility device 110.

In some embodiments, the electronic processor 200 also transmits the data for remote or virtual processing (at block 625). In some embodiments, the electronic processor 200 transmits the converted data for virtual processing over a network associated with the networking protocol. As described above, the electronic processor 200 may transmit the data to the facility device 110 (as a gateway device). For example, as illustrated in FIG. 7, the end point devices 105 transmit the converted fixture data to the facility device 110. In some embodiments, the end point device 105 (for example, the electronic processor 200) maintains a backlog of data packets (for example, the converted data) until a connection to, for example, the facility device 110 is available (for example, in the event that a connection to the facility device 110 is temporarily unavailable). The facility device 110 may then forward the data to a remote device, server, or database for virtual processing in the cloud, such as, for example, the server 115, the user device 120, or a combination thereof (as seen in FIG. 7). As one example, a user may use the user device 120 (or another remote device) to access and interact with the data. The user may view and interact with usage patterns, which may allow a facility entity or maintainer insights into, for example, how to optimize cleaning and maintenance schedules (for example, for preventative or predicted maintenance), whether there is a need for additional facilities, end point devices, or a combination thereof, and the like. As noted above, in some embodiments, the server 115 is configured to monitoring and managing one or more facilities, including the fixtures 107 therein. In some embodiments, the server 115 (via an electronic processor of the server 115) may receive fixture data from the facility device 110. In response to receiving the fixture data, the server 115 may process the fixture data in order to determine usage information or patterns associated with the one or more facilities, including the fixtures 107 thereof. Alternatively or in addition, in some embodiments, the server 115 may monitor or track a battery or power level (for example, as a battery condition or characteristic) associated with the end point device 105.

As one example, where the fixture 107 is a faucet, the server 115 may analyze the fixture data to monitor the communications between the EM elements 125 of a fixture 107 (for example, a sensor and an actuator) to track, among other things, the number of "ON" and "OFF" signals (or activations). Alternatively or in addition, the server 115 may analyze the fixture data to detect the flow of water by monitoring temperature data from a temperature sensor (as an EM element 125 of the fixture 107) either positioned within the drain or the faucet itself. Alternatively or in addition, the server 115 may analyze the fixture data to determine when a run-on condition has occurred in response to determine that a predetermined period of time set by a user is exceeded and the faucet did not return to an "OFF" condition or water flow is still detected. Alternatively or in addition, the server 115 may analyze the fixture data to calculate water usage indirectly based at least in part on a duration of time that the valve of the faucet remains open and an estimated water flow rate.

As yet another example, where the fixture 107 is a flush valve, the server 115 may analyze the fixture data to monitor a magnitude of a voltage and/or current supplied to the EM element 125 (for example, an actuator) of the fixture 107 to track when a flushing event has been initiated. Alternatively or in addition, the server 115 may analyze the fixture data to determine when an "ON" signal is provided (for example, a person is detected) but no corresponding movement of the valve occurs. In such instances, the server 115 may generate and provide an error signal such that an alert may be generated via, for example, the facility device 110, the user device 120, another component of the system 100, or a combination thereof. Such faults may be detected by detecting an elevated voltage or current rate (for example, motor is bound). Alternatively or in addition, the server 115 may analyze the fixture data to determine a length of time a person is detected using the fixture 107 on any given instance.

As yet another example, where the fixture 107 is a resource dispenser, the server 115 may analyze the fixture data to monitor a magnitude of a voltage and/or current supplied to an EM element 125 (for example, an actuator) of a fixture 107 to track when a resource dispensing event has occurred. Alternatively or in addition, the server 115 may analyze the fixture data to monitor a level or amount of resource remaining in a reservoir of the fixture 107. The server 115 may calculate an amount of resource remaining in a reservoir of the fixture 107 by subtracting a predetermined volume or amount of resource discharged during a resource dispensing event for each detected activation. In some embodiments, when the server 115 determines that a level or amount of resource remaining in a reservoir of the fixture 107 has fallen below a predetermined amount or level, the server 115 may generate and provide an error signal such that an alert may be generated via, for example, the facility device 110, the user device 120, another component of the system 100, or a combination thereof.

Additionally, in some embodiments, the battery life (for example, an energy level or energy usage) may be monitored using various indicators, such as a graphical representation of a fuel gauge. Alternatively or in addition, in some embodiments, the server 115 (an electronic processor thereof) may generate alerts and warnings in response to detecting a predetermined energy level, where the predetermined energy level indicates an end of battery life scenario, an energy source replacement scenario, and the like. As one example, when the electronic processor of the server 115 detects a predetermined energy level indicating a low energy level, the electronic processor of the server 115 may generate and transmit a low energy level alert to a user of the user device 120 (via, for example, a display device of the user device 120).

Thus, the embodiments provide, among other things, to methods and systems for monitoring and managing a facility having a plurality of end point device. Various features and advantages of certain embodiments are set forth in the following claims.

What is claimed is:
1. An end point device associated with a facility, the end point device comprising:
 a first energy source; and
 an electronic processor communicatively coupled to the first energy source and powered by the first energy source, the electronic processor configured to
  detecting an operation of a fixture associated with the facility, and
  in response to detecting the operation of the fixture,
   receive data from at least one electro-mechanical element of the fixture associated with the facility, the data related to the operation of the fixture,
   convert the data pursuant to a networking protocol, and
   enable, over a network associated with the networking protocol,
   transmission of the converted data to a remote device for virtual processing.
2. The end point device of claim 1, wherein the networking protocol is a LoRa networking protocol.
3. The end point device of claim 1, wherein the fixture is a water management solution.

4. The end point device of claim 1, wherein the electronic processor is configured to transmit the data for virtual processing via a gateway device of the facility.

5. The end point device of claim 1, wherein the end point device is associated with the fixture.

6. The end point device of claim 1, wherein the end point device includes a second energy source, the second energy source configured to power the electronic processor.

7. The end point device of claim 1, wherein the end point device includes an energy source holder for receiving the first energy source.

8. The end point device of claim 7, wherein the energy source holder and the first energy source are positioned within a housing having a lid portion.

9. The end point device of claim 8, wherein the lid portion is configured to enable access to the energy source holder and the first energy source.

10. The end point device of claim 1, wherein the first energy source is a replaceable battery.

11. A system for monitoring and managing a facility including a plurality of end point devices, the system including:
an end point device including an electronic processor, the electronic processor powered by an energy source local to the end point device, wherein the electronic processor is configured to
detect an operation of a fixture associated with the facility, and
in response to detecting the operation of the fixture,
receive data from at least one electro-mechanical element of the fixture associated with the facility, the data related to the operation of the fixture,
convert the data pursuant to a networking protocol, and
enable, over a network associated with the networking protocol,
transmission of the converted data for virtual processing.

12. The system of claim 11,
wherein the end point device is configured to wake up from a sleep mode in response to detecting the operation of the fixture.

13. The system of claim 11, wherein the electronic processor is configured to transmit the converted data to a facility device associated with the facility, the facility device configured to forward the converted data to a remote device for virtual processing.

14. The system of claim 13, wherein the remote device is a central cloud-based database.

15. The system of claim 11, wherein the networking protocol is a LoRa networking protocol.

16. The system of claim 11, wherein the virtual processing includes monitoring an energy level of the energy source local to the end point device and, in response to detecting a predetermined energy level, generating a low energy level alert.

17. The system of claim 11, wherein the virtual processing includes monitoring an energy level of the energy source local to the end point device and generating a graphical indicator of the energy level.

18. A method for monitoring and managing a facility, the method comprising:
providing an end point device powered by an energy source, the energy source local to the end point device;
powering, with the energy source, one or more components of the end point device;
detecting an operation of a fixture associated with the facility; and
in response to detecting the operation of the fixture,
receiving, with an electronic processor of the end point device, data from at least one electro-mechanical elements of the fixture associated with the facility, wherein the data is associated with the operation of the fixture; and
in response to receiving the data,
converting, with the electronic processor, the data pursuant to a networking protocol, and
transmitting, over a network associated with the networking protocol with the electronic processor, the converted data for virtual processing.

19. The method of claim 18, further comprising:
mounting the end point device to the fixture; and
communicatively coupling the end point device to the fixture,
wherein the fixture is a pre-existing fixture of the facility.

20. The method of claim 18, wherein transmitting the converted data for virtual processing includes transmitting the converted data to a facility device, the facility device configured to collect data associated with a facility and forward the data associated with the facility to a remote device for virtual processing.

\* \* \* \* \*